United States Patent [19]
Ryden et al.

[11] Patent Number: 5,569,079
[45] Date of Patent: Oct. 29, 1996

[54] DEVICE FOR SAMPLING GRAIN

[76] Inventors: David M. Ryden, 315 S. Forest; David W. Ryden, Jr., 219 N. Second St., both of Hallock, Minn. 56728

[21] Appl. No.: 400,795

[22] Filed: Mar. 8, 1995

[51] Int. Cl.$^6$ ........................................... A01F 5/00
[52] U.S. Cl. ................ 460/16; 460/150; 56/16.5; 56/126
[58] Field of Search ........................ 460/7, 16, 23, 460/150, 24, 45, 96, 901, 64, 65, 61; 56/16.4, 16.5, 126, 219, 222, 239

[56]             References Cited
              U.S. PATENT DOCUMENTS

| | | |
|---|---|---|
| 1,910,357 | 5/1933 | Nye. |
| 4,337,782 | 7/1982 | Da Silva .................................. 460/64 |
| 4,417,593 | 11/1983 | Brehon ................................ 460/150 X |
| 4,724,632 | 2/1988 | Bilsland et al. ..................... 460/61 X |
| 5,041,058 | 8/1991 | Quimby ............................... 56/239 X |
| 5,106,340 | 4/1992 | Quimby ............................... 56/239 X |

Primary Examiner—Terry Lee Melius
Attorney, Agent, or Firm—Merchant, Gould, Smith, Edell, Welter & Schmidt, P.A.

[57]              ABSTRACT

A portable device as disclosed for threshing grain to obtain a sample to be tested, for example, for its moisture content, disease, and protein content. The grain sampling device includes a housing with a handle enabling the device to be carried, an inlet for sampled grain, a chaff outlet and a collection drawer for the threshed grain kernels. Grain entering the inlet first passes through a declustering device consisting of a first group of stationary, transversely disposed pins and a second plurality of transversely disposed pins that are carried on a rotating first gear wheel. The threshing function is performed between a vertically disposed, stationary surface having a layer of resilient, frictional material, and a second gear wheel disposed in substantially parallel, spaced relation to the stationary surface, and which includes a layer of resilient, frictional material in disk form that defines a movable threshing surface. The space between the two surfaces is adjustable and chosen as a function of the type of grain to be threshed. The threshed grain sample falls into a set of transversely disposed, angular vanes that are continuously reciprocated or shaken to facilitate sifting of the chaff from the grain kernels. A blower emanates a steam of air that passes from below the angular vanes on one side angularly through to the top of the vanes and toward the chaff outlet, carrying the chaff with it for discharge. The grain kernels are of sufficient density to fall through the angular vanes into the collection drawer. A sensor can be disposed in the drawer to determine the moisture content or other parameter of the grain sample.

33 Claims, 5 Drawing Sheets

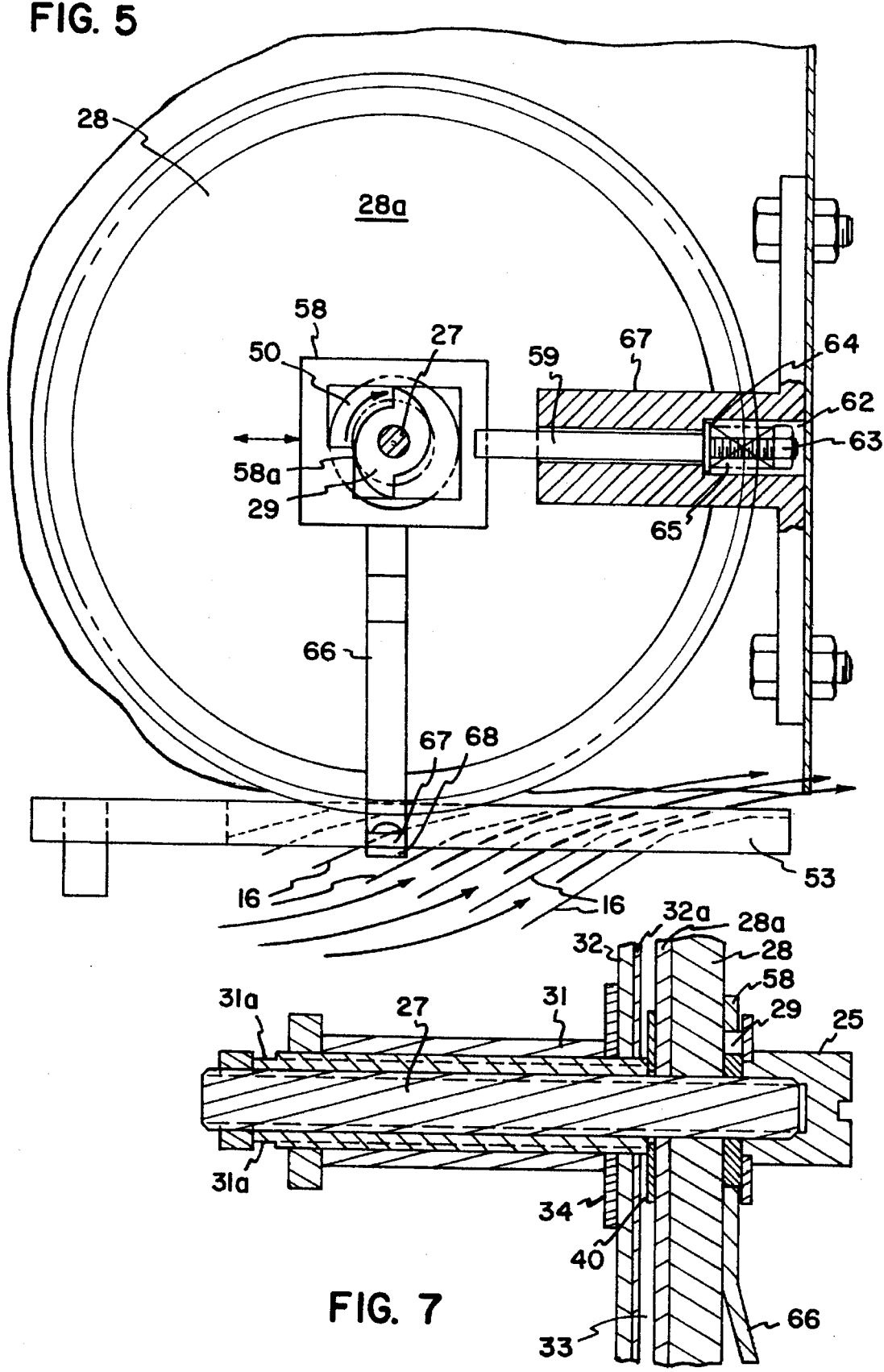

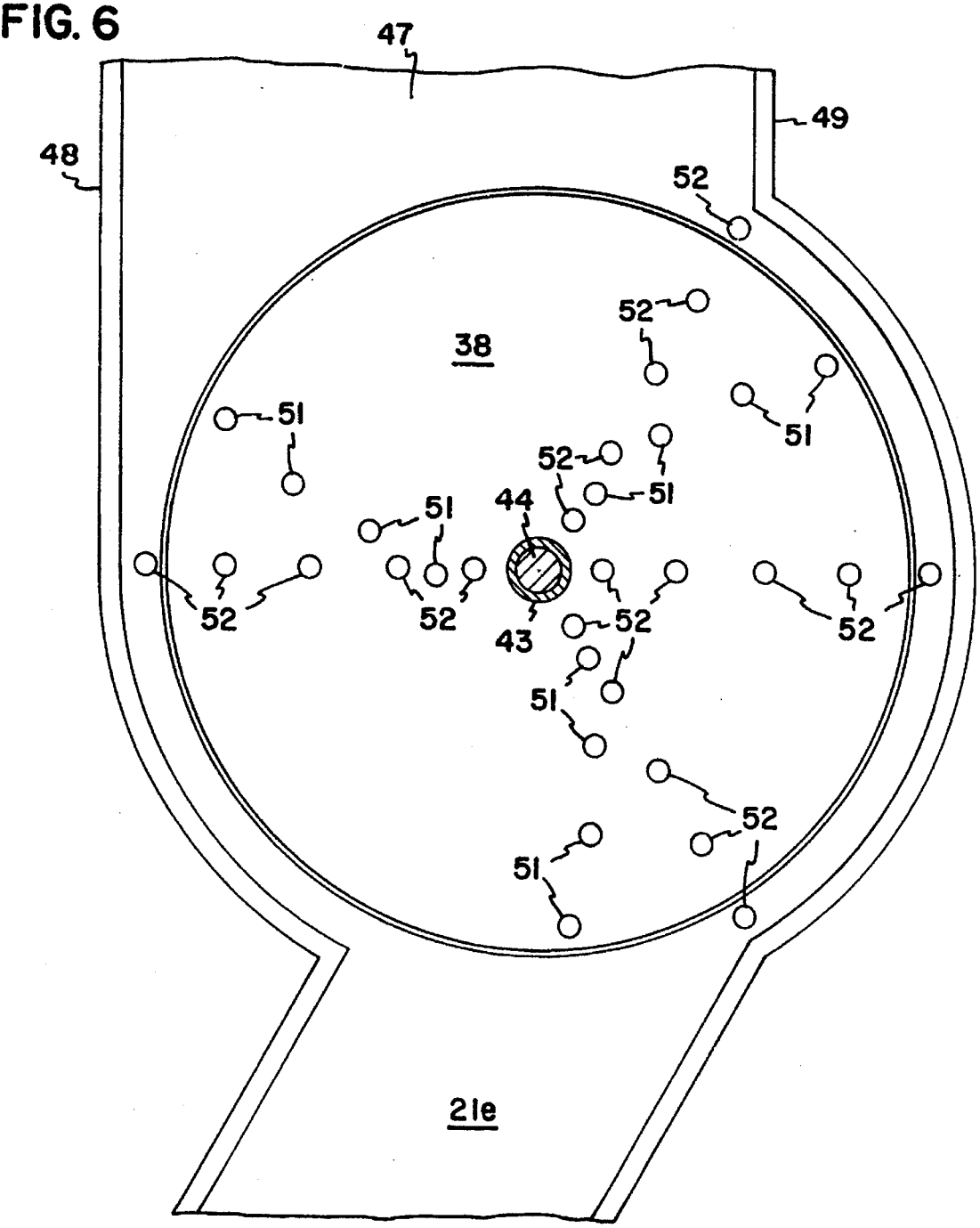

DEVICE FOR SAMPLING GRAIN

BACKGROUND OF THE INVENTION

The invention broadly relates to grain threshing and is specifically directed to a portable grain sampling device used for threshing grain for sample testing.

As the harvest season approaches, it is common practice for grain farmers to test the moisture content of the growing grain to determine the precise point at which it should be harvested. If it is harvested prematurely, when the moisture content is high, the grain requires drying in a grain drying elevator, which is time consuming and extremely expensive. If harvesting is delayed until the grain is too dry, the grain crop is worth less on the market. To optimize the value of the grain crop, it is therefore necessary to periodically determine the moisture content of the grain and to harvest it at the point at which the grain is properly ripened and therefore capable of maximizing the farmer's monetary return for invested work and expense.

While this concept is easily articulated, it is much more difficult to execute. Currently, grain samples of sufficient quantity to determine moisture content are obtained by operating the farmer's combine at various points in the field. This means that the combine must be transported to the field and operated at various points. For larger grain farms, these distances alone may be quite significant. Further, the combine is a large, complex machine that is slow to transport and quite expensive to operate. It will typically take several hours for the farmer to transport the combine to the field and to operate it at various points to determine whether the grain is ripe for harvest. The problem is compounded significantly if the fields are wet from a recent rain due to the size and weight of the combine, and this may even delay grain sampling beyond the point of optimum harvest.

Our invention has been designed and developed to enable the farmer to quickly and efficiently take grain samples from various points in the grain field without the use of a combine. Specifically, the invention resides in a portable grain sampling device which is relatively small and lightweight, and which can be easily carried by a single person to and into the field for grain sampling and moisture content determination.

In the preferred embodiment, the portable grain sampling device is contained in a metal cabinet or enclosure having a top handle enabling it to be carried in much the same manner as a suitcase. A grain sample collector taking the form of a large cup with an open front and a plurality of forwardly projecting tines enables the farmer to gather several scoops of grain at a particular point in the field and to deposit them in a collection bag.

The sampled grain heads are then fed slowly into the inlet of the portable grain sampling device several at a time. At a first stage, the grain heads, which are in a clustered form, are broken up by passing them through a plurality of relatively moving pins that are disposed transverse to grain movement. Specifically, a first set of transverse pins is carried the cabinet frame and a second set is rotated on a large gear wheel.

The declustered grain sample drops by gravity and is funneled into a unique threshing stage. The threshing stage consists of a stationary vertical surface having a layer of resilient material such as rubber, which is disposed in spaced relation to a spaced, parallel rotating surface that is also resilient and frictional. The rotating surface preferably takes the form of a second relatively large gear wheel the face of which also has a layer (disk) of rubber, and which also drives the first gear wheel. The space between the stationary and rotatable surfaces is adjustable as a function of the type of grain that is being sampled. It has been found that rotating one resilient, frictional surface relative to a stationary surface is highly efficient in breaking up the grain and separating the grain kernels from the chaff. The threshing principle may be utilized on full size threshing equipment including combines. It is possible to accomplish relative movement in different manners, but rotating a large disk relative to a stationary surface is relatively simple and effective.

After threshing, the grain kernels and chaff fall by gravity into a separation stage, consisting of a plurality of angular vanes that are transversely disposed to the downward path of grain movement. The vanes are carried by a frame that is continuously reciprocated or shaken in a sifting manner. A blower within the cabinet having an outlet disposed to the side and below the vanes causes a stream of air to move upwardly through the vanes, lifting the chaff from the vanes and preventing it from falling through. A chaff outlet located in the side of the cabinet allows the separated chaff to be discharged from the device.

The grain kernels are of greater density, and they fall through the vanes into a collection drawer below. The grain sample can then be tested, for example, for moisture content, microbial or fungal disease, protein content, test weight, and other like parameters. A sensor can be contained in the drawer, for example, to enable the farmer to immediately determine the moisture content, or other measurement, of the sampled grain.

The grain sampling device may be operated manually through the use of a hand crank or through an optional electric motor drive mechanism. The motor drive mechanism can be powered by connecting a cable from the farmer's utility vehicle (connected directly to the battery or to the cigarette lighter) and plugged into the sampling device.

This process can be repeated at various points in the grain field until the moisture content is properly determined, enabling the farmer to quickly and easily determine when the grain should be harvested.

Compared with the conventional approach of sampling by combine, the portable grain sampling device represents a significant savings in time and expense. The device is sufficiently portable that it may be easily placed in the farmer's utility vehicle (e.g., pickup truck) and driven to each point at the field. Since the utility vehicle can operate at normal road speed as compared with the slow moving combine, this in itself saves hours of time. As compared to the costs of operating a combine, driving the portable grain sampling device from point to point represents a significant saving of several hundred and perhaps more than a thousand dollars depending on the size of the grain field and the number of points sampled.

The inventive portable grain sampling device will be more fully appreciated from the accompanying description and drawings.

BRIEF DESCRIPTION OF THE DRAWINGS

FIG. 5 is a further enlarged fragmentary sectional view of the primary drive gear wheel with associated operating mechanisms;

FIG. 6 is an enlarged fragmentary sectional view of a driven gear wheel that breaks up grain clusters;

FIG. 7 is an enlarged sectional view of a multi-component drive shaft for the grain sampling device.

DESCRIPTION OF THE PREFERRED EMBODIMENTS

Figure 1:
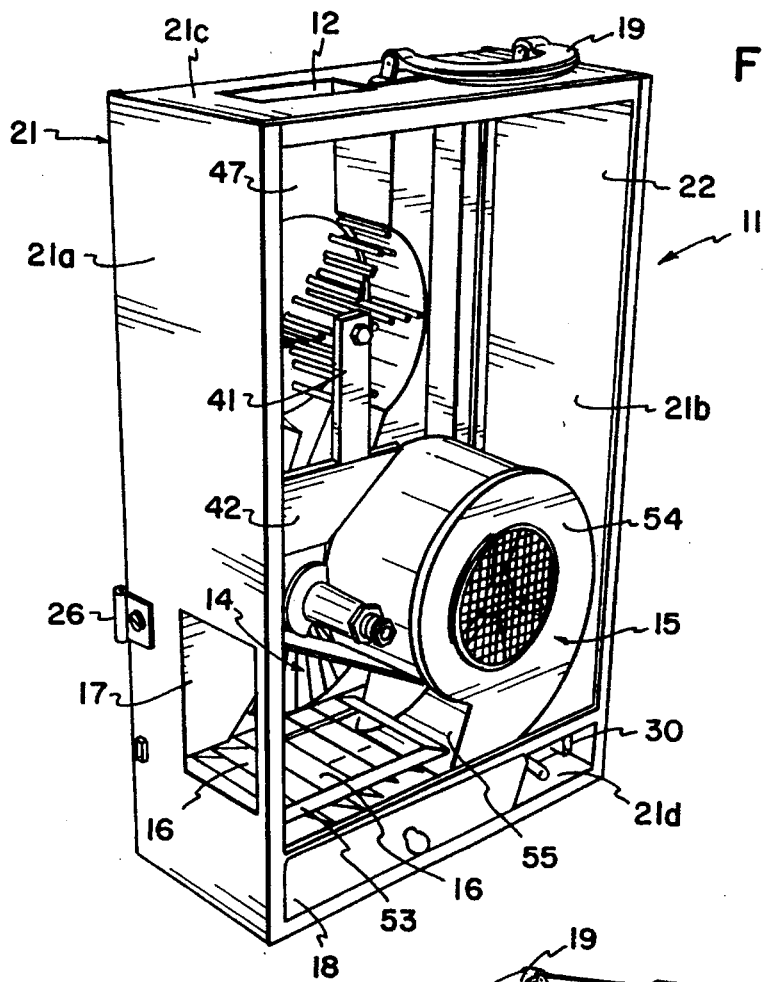
FIG. 1 is a perspective view of a portable grain sampling device embodying the invention as shown from the front side thereof.
Figure 2:
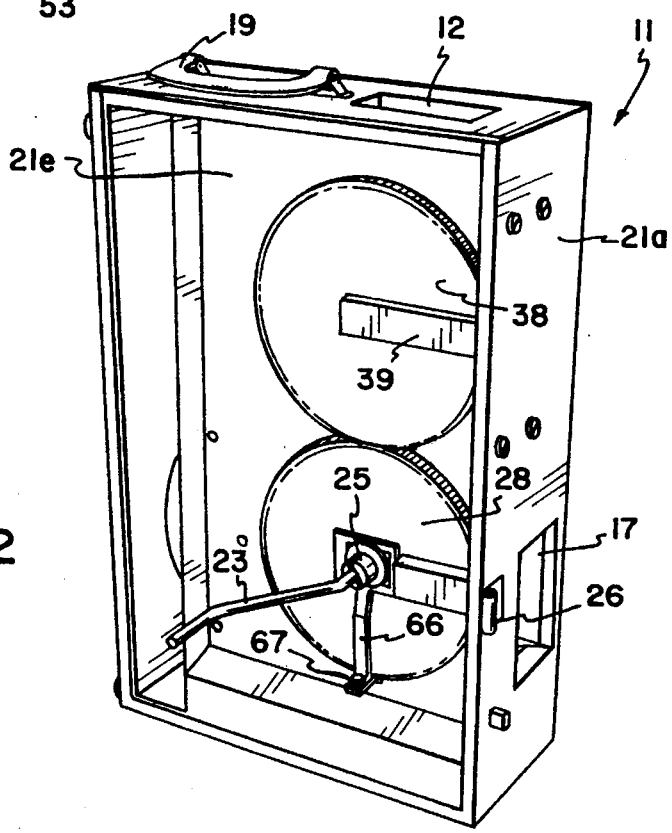
FIG. 2 is a perspective view of the grain sampling device as viewed from the rear side thereof showing the device in a manually operable mode.

With initial reference to FIGS. 1 and 2, a portable grain sampling device is represented generally by the numeral 11. The function of grain sampling device 11 is to receive a small volume of grain mixed with chaff through a grain inlet 12, to break up grain clusters through the use of a gear wheel mechanism shown generally at 13, to thresh the grain (i.e., separate the grain kernels from the chaff) by a threshing mechanism shown generally at 14, to discharge the chaff from the device 11 through the use of a blower 15 that drives air through a plurality of vanes 16 and blows the chaff through a first outlet 17, and the depositing of grain kernels into a collection drawer 18 which serves as a second outlet for the device.

Specifically, grain sampling device 11 consists of an external housing 21 that is formed from sheet metal in the preferred embodiment, including sides 21a, b, a top 21c, a bottom 21d and various internal frame components discussed below that support the various mechanisms of the device. Inlet 12 is located in the top 21c and a carrying handle 19 is secured to its top surface. The chaff discharge outlet 17 is located in side 21a. Collection drawer 18 rests on the bottom 21d.

In the preferred embodiment, and with specific reference to FIG. 1, a plexiglass plate 22 covers the front of the grain sampling device 11, enabling the user to view the various operations. This front plate can be made from sheet metal as an alternative. There is no corresponding back as shown in FIG. 2, but as shown in this Figure, the housing includes a vertical separating partition 21e that supports various operating mechanisms of device 11. The back of device 11 is open to permit interchangeability of a manual drive, taking the form of a hand crank 23, or a 12-volt electric drive mechanism 24 (see FIG. 3), enabling the grain sampling device 11 to be powered from a utility vehicle such as a pickup truck.

Figure 3:
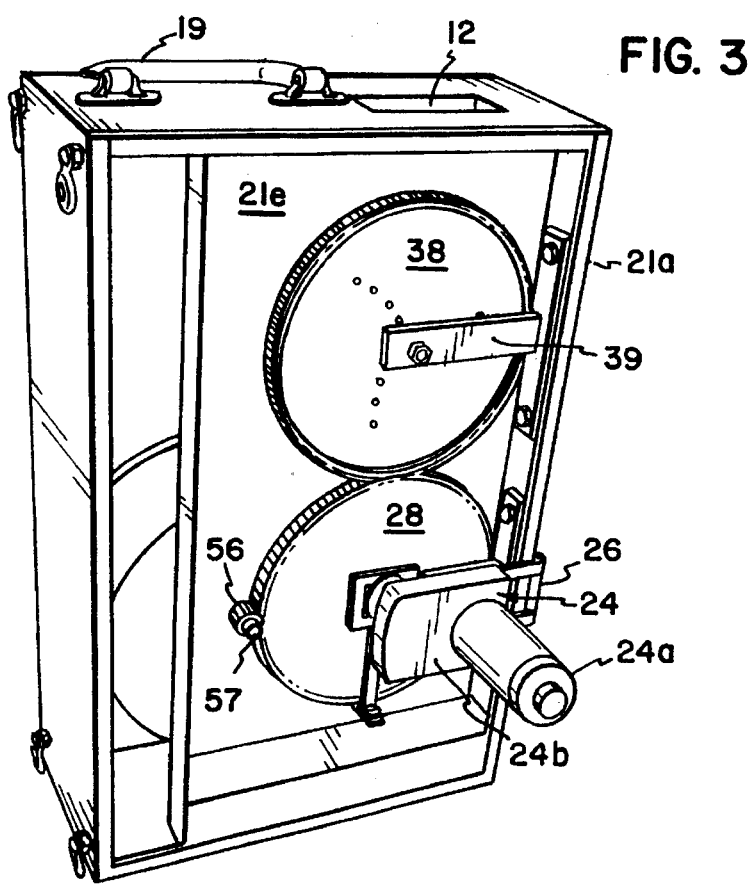
FIG. 3 is a perspective view of the rear side of the grain sampling device shown in a motor operated mode.

With reference to both FIGS. 2 and 3, the electric drive mechanism 24 includes a 12-volt DC motor 24a and a gear drive 24b. Whether the manual or electric drive option is chosen, the primary driven element is a multi component drive shaft the initial component of which is a slotted hub 25 (see FIG. 2 and also FIG. 4) which is engageable either by the hand crank 23 or the gear drive 24B. The hand crank 23 includes a shaft with a cross pin (not shown) that interlocks into the slotted hub 25. The motor drive mechanism 24 is held in place at one side by its interlockable engagement with hub 25 and its opposite side by a hinge-pin device 26 (see FIGS. 2 and 3).

When the optional motor drive mechanism 24 is used, it is provided with 12 v DC power from a utility vehicle such as a pickup truck. An electric connector 30 (FIG. 1) receives electrical power from a connecting cable (not shown) connected to the vehicle battery or cigarette lighter.

With reference to FIG. 7, the multi-component drive shaft comprises an elongated primary shaft component 27 that has threaded portions at each end but is otherwise unthreaded. A large gear wheel 28, which in part performs the threshing function as described below, includes a central threaded aperture and is screwed onto the shaft element 27 at its right end as viewed in FIG. 7, and rotates with shaft element 27. A cam 29 having a pair of diametrically opposed lobes (see also FIG. 5), includes a central threaded aperture and is also screwed onto the right end of shaft element 27 against the right face of gear wheel 28. A large washer 50 slides over shaft element 27 and bears against cam 29. The purpose of cam 29 will be described in further detail below. The slotted hub 25 also is formed with an internal threaded bore, and it is screwed onto shaft element 27 and tightened against washer 50. As constructed and assembled, slotted hub 25, cam 29 and gear wheel 28 rotate together with the primary shaft element 27.

A larger washer 40 slides over primary shaft element 27 and bears against the left face of gear wheel 28.

An elongated, externally threaded hollow tube 31 also slides over primary shaft element 27 to the point of engagement with the washer 40. However, there is no threaded engagement between the externally threaded tube 31 and shaft element 27, and the former therefore free wheels or floats on the latter. At the extreme left end of externally threaded tube 31 a plurality of flats 31a are machined to permit threaded tube 31 to be adjustably rotated with a wrench as described below.

A vertical funnel wall 32, which is a downward extension of an inlet grain chute connected to inlet 12 (described below), also is formed with a threaded aperture that threadably receives the externally threaded tube 31. Threaded tube 31 is initially screwed into funnel wall 32 at a position so that a predetermined space 33 is defined between the funnel wall 32 and the gear wheel 28.

A large washer 34 is placed over threaded tube 31 and bears against the left face of funnel 32. An elongated, non-threaded spacer tube slides over threaded tube 31 and bears against washer 34. A large jam nut 36 is threaded onto the threaded tube 31 and tightened against the left end of spacer tube 35. This holds the funnel 32 in the predetermined position on the threaded tube 31, thus defining the amount of space 33 between vertical funnel wall 32 and gear wheel 28.

The last component of the multi component drive shaft is a threaded nut 37, which screws onto the primary shaft element 27 at its left end, bearing against the externally threaded tube 31, locking the entire assembly together.

As constructed and arranged, rotation of the slotted hub 25 (either manually or by the 12-volt DC motor) causes gear wheel 28 to rotate relative to the stationary funnel wall 32, with these elements spaced apart as shown at 33. It is the space 33 which defines the threshing area for the grain. To accomplish this threshing function, the entire left face of the gear wheel 28 is provided with a layer of rubber 28a (in the form of a disk) or any other suitable alternative material that creates a resilient and frictional surface and defines a first vertical threshing surface. Similarly, a layer of rubber 32a is provided on the right face of the vertical funnel wall 32 to define a second vertical threshing surface. These threshing surfaces are substantially vertical when the device 11 is in an upright position. They are maintained in parallel, spaced relation, and the rotational axis of the shaft element 27 is substantially perpendicular to these parallel surfaces.

Unthreshed grain enters the funnel defined in part by the funnel wall 32 from above and enters the space 33, where it is engaged and frictionally rolled between the rotating rubber layer 28a and stationary layer 32a. It has been found that the relative rotational movement between these two surfaces results in effective threshing of the grain, quickly and efficiently separating the grain kernels from the chaff, all of which drop by gravity for separation as described below.

The space 33 between funnel 32 and gear wheel 28 is chosen as a function of the type of grain to be threshed, and this space may be adjusted for various types of grains. This is accomplished by loosening the jam nut 36 and end nut 37, and through the use of an appropriately sized wrench placed on the flats 31a, rotating the externally threaded tube 31. Since the funnel wall 32 is threaded onto the threaded tube 31, this causes the funnel 32 to axially move to the right or left depending on the direct of rotation, increasing or decreasing, thus the width of space 33. When the desired space 33 is obtained, the jam nut 36 is tightened against spacer tube 35 and end nut 37 is tightened in place. It is possible to calibrate this adjustment and to include an appropriate scale for different types of grains (not shown), or to use a thickness gauge that can be inserted into the space 33 to determine the appropriate spacing.

Figure 4:
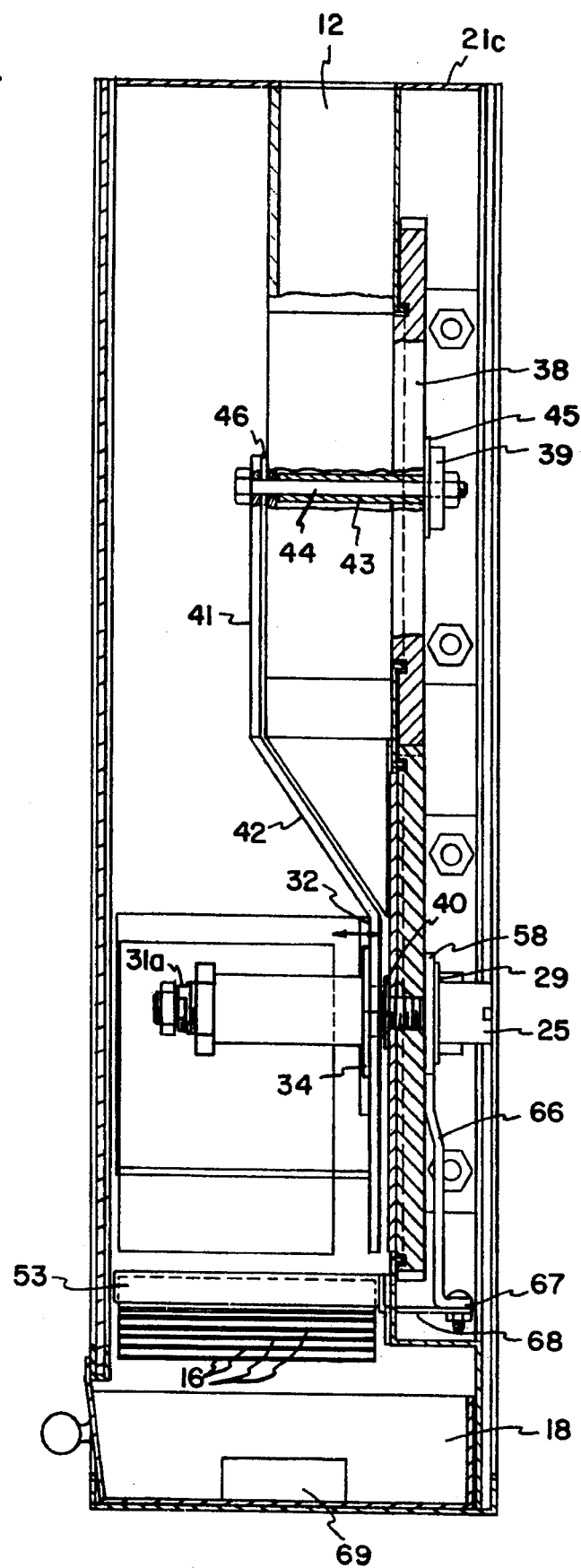
FIG. 4 is an enlarged longitudinal sectional view of the grain sampling device.

With reference to FIGS. 1–4, a second large gear wheel 38 similar in size to gear wheel 28 is rotatably mounted above gear wheel 28 in rotatable meshing engagement therewith. Gear wheel 38 is rotatably mounted between a rear stationary frame member 39 which is horizontally disposed (FIG. 2), and a front vertical frame member 41 (FIG. 1). With specific reference to FIGS. 1 and 4, the vertical frame member 41 projects upwardly from an angled wall 42 that also defines the grain funnel and leads to the vertical wall 32. As shown in FIGS. 3 and 4, the horizontal frame member 39 is T-shaped and bolted to the housing side 21a.

With reference to FIG. 4, gear wheel 38 has an axially projecting hub 43 which rotatably free wheels on a supporting bolt or axle 44. A washer 45 is disposed between the right face of gear wheel 38 and the horizontal frame member 39. However, vertical frame member 41 is spaced from the left end of gear wheel 38, as indicated at 46. This space is necessary to accommodate the axial adjustment of the vertical funnel wall 32 (described above) from which it projects.

With reference to FIGS. 1, 4 and 6, inlet 12 in top 21c leads to an entry chute defined in part by side walls 48, 49 that are carried by the housing 21. Each of the side walls 48, 49 is initially vertically disposed as it extends downward from the inlet 12. However, as best shown in FIG. 6, these side walls are arcuately formed to accommodate the large gear wheel 38 which they surround. Below the gear wheel 38, the walls 48, 49 angle downward in parallel relation, leading into the funnel defined on the front side by angled funnel wall 42 and thereafter vertical funnel wall 32. The rear side of this funnel is defined by the large gear wheels 38, 28 themselves, together with the separating partition 21e. As constructed, the unthreshed grain is channeled from the inlet 12 through the guiding chute and funnel to the space 33 for threshing.

Because grain kernels and chaff are generally clustered to some extent when they are harvested, it is necessary to break up these clusters before the threshing step can be effectively undertaken. To that end, and with specific reference to FIGS. 1 and 6, gear wheel 38 is provided with a number of laterally projecting horizontal pins 51 that rotate relative to a plurality of stationary pins 52 that project laterally from the separating partition 21e. As shown in FIG. 6, the rotating pins 52 are disposed along three arcuate lines that extend radially outward from the center of gear wheel 38, and the stationary pins 52 are disposed in four straight lines that extend radially outward from the axis of gear wheel 38. The pins 51, 52 are arranged so that relative movement therebetween is at predetermined spaced intervals as they approach and mutually pass. It has been found that this relative rotational movement is effective in causing the grain clusters to be broken up into smaller particles which thereafter drop by gravity into the guiding chute and funnel for threshing.

After threshing between the stationary frictional surface 32a and rotatable frictional surface 28a, the separated grain kernels and chaff fall by gravity together to the separation stage.

With reference to FIGS. 1 and 5, this separation stage is defined in part by a plurality of vanes 16, which are irregularly angled in louver fashion. The vanes 16 are carried by an external rectangular frame 53 which is continuously reciprocated or shaken to facilitate the grain kernel/chaff separation. A stream of air emanating from the blower 15 enters the vanes from below (FIG. 7), blowing the separated chaffed upward and out of the discharge outlet 17. The grain kernels themselves are of much greater density that the chaff, and they fall by gravity into the collection drawer 18.

The blower 15 is conventional in nature, including a blower housing 54 that is generally circular with a tangentially disposed outlet 55. The fan portion of blower 15 consists of a plurality of radially extending fins or vanes that are rotated at relatively high speed. This is accomplished through the use of a small gear 56 (see FIG. 3), which is mounted on the externally projecting fan shaft 57 and disposed in intermeshing relation with the lower gear wheel 28.

The reciprocation or shaking of the vanes 16 is accomplished through a mechanism that is best shown in FIGS. 2, 4 and 5. Specifically, it will be recalled that a cam wheel 29 is mounted on and rotates with the primary shaft element 27. Disposed in surrounding relation to the rotatable cam 29 is a rectangular cam follower 58 which is best shown in FIG. 5. Follower 58 includes an internally projecting corner 58a that is in substantially constant engagement with the diametrically opposed lobes of the cam wheel 29. Cam follower 58 is retained in this surrounding relation with cam wheel 29 on one side by the gear wheel 28 and on the other side by the larger washer 50 retained by slotted hub 25 (see also FIG. 7).

With continued reference to FIG. 5, a horizontal rigid linkage member 59 extends laterally of the cam follower 58 into a horizontally disposed, hollow guide member 61 that is mounted to the side wall 21a of housing 21. An internal chamber 62 within the guide member 61 receives the extreme right end of linkage member 59, which takes the form of a threaded bolt with a nut 63 at one end and a washer 64 at the other. A conventional compression spring 65 is mounted between the washer 64, which remains stationary, and the nut 63, which continuously reciprocates by virtue of cam wheel 29 and follower 58. The spring 65 normally urges the rectangular cam follower 58 to the right as viewed in FIG. 5, which ensures that the cam follower projection 58a will be in substantially continuous engagement with cam wheel 29. As such, it will be appreciated that, as the cam wheel 29 moves in a clockwise direction as shown, the cam follower 58 progressively moves to the left until the follower portion 58a clears the edge of the first cam lobe, at which time the cam follower 58 moves immediately to the right under the influence of spring 65 where it begins engagement with the second lobe. The end result is a constant horizontal reciprocation of the cam follower 58 at an amplitude that corresponds to the size of the cam lobes, and the cycle of which is twice as fast as the rotation of gear wheel 28.

With reference to FIGS. 2, 4 and 5, vertical linkage member 66 extends downward from the rectangular cam follower 58, terminating in a small horizontal foot. As best shown in FIG. 4, a horizontal linkage member 68 projects laterally from the rectangular vane frame 53 and is secured thereto with a nut and bolt. This imparts through the vane frame 53 the same reciprocal movement generated between the cam wheel 29 and cam follower 58, resulting in continuous shaking of the vanes 16 to facilitate separation of the chaff from the grain kernels.

As described above, the chaff is thereafter blown out of the chaff outlet 17 under the influence of the air stream emanating from blower 15, while the grain kernels, due to their heavier density, fall by gravity into the collection drawer 18. A conventional moisture sensor or detector 69 is preferably placed in collection drawer 18, which may include a digital readout (not shown) located at any easily visible point on the housing 21.

Figure 8:
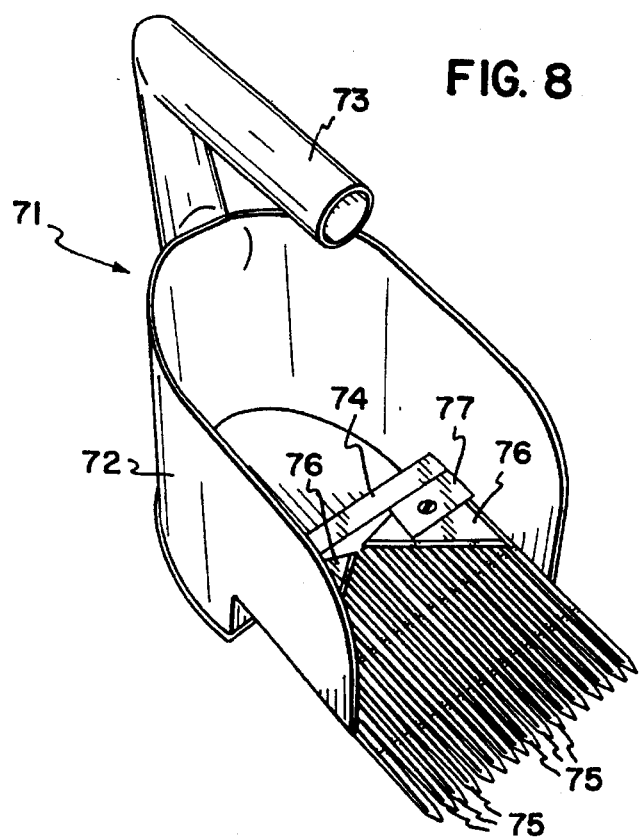
FIG. 8 is a perspective view of a grain sample collector.

With reference to FIG. 8, a grain sample collector is represented generally by the numeral 71. Sample collector 71 includes a U-shaped cup member 72 carried by a handle 73. In the preferred embodiment, cup member 72 is opened not only at its top and front side but its bottom as well. The open bottom permits a grain collecting bag or other container to be connected to the bottom of collector 71. It is also possible for the cup member 72 to have a closed bottom and for the collected grain sample to be poured into a collecting bag or directly into the inlet 12 of grain sampling device 11.

A transverse support member 74 extends between the walls of cup 72 at the front, lower portion thereof. A plurality of pointed tines 75 are carried by the support member 74 and project forwardly from the cup 72. A pair of conventional razor blades 76 of trapezoidal shape, of the type commonly found in utility knives, are disposed at the rear corners of the tines 75 and retained by small clamping members 77 that are screwed into the support member 74.

The tines 75 are spaced to permit entry of the stalk of a grain plant. This enables the user to move the collector 71 into a group of grain stalks at a level beneath the heads of grain, and by tilting the collector 71 rearward and lifting upwardly, the grain heads are stripped from the grain by engagement with the razor blades 76. The stripped grain heads are channeled into the cup 72 and deposited into the collection bag.

In the overall operation of the portable grain sampling device 11, grain samples are preferably taken from a number of points in the grain field. Because of the complete portability and effectiveness of the grain sampling device 11, the user need only drive a utility vehicle to various points around the grain field and to take samples from each point and to test the moisture content.

At each point, only a few scoops through use of the sample collector 71 are necessary. The collected sample is deposited into the inlet 12 of grain sampling device 11 and the device is then operated either manually by the hand crank 23 or the electric motor drive mechanism 24. As described above, the grain clusters are broken up by the relative rotational movement between spaced pins 51, 52 at the upper end of device 11, and then dropped into the threshing area between the rotating resilient disk 28a and the stationary resilient surface 32a. This separates the grain kernels from the chaff, all of which drop by gravity into the separation stage defined by the reciprocating or shaking vanes 16, and with the incidents to the air stream from blower 15 the chaff is blown from discharge outlet 17. The grain kernels themselves, due to greater density, drop by gravity into the collection drawer 18 which can contain sensor 69, for example, for sensing moisture content, or other parameter, of the grain.

The user records this data and then moves to the next point in the grain field. After grain samples from a number of points have been taken and measured, a proper determination can be made as to whether the grain should be fully harvested.

This approach to grain sampling and moisture content determination saves both significant time and money as compared to the current practice of transporting and operating a large, expensive combine at various points in the grain field.

What is claimed is:

1. A portable grain sampling device, comprising:

housing means defining an inlet for grain to be sampled, a first outlet for chaff separate from said grain sample and a second outlet for grain kernels separated from said grain sample;

threshing means disposed in the housing means for threshing the sampled grain, the threshing means communicating with the housing inlet and comprising first and second substantially planar threshing surfaces disposed in substantially parallel relation, each of said threshing surfaces being formed at least in part from a material that is frictional relative to the grain sample, and drive means for effecting relative movement between said first and second threshing surfaces while maintaining said spaced, substantially parallel relation; and separation means disposed in the housing means for receiving the threshed grain from the threshing means, for separating chaff from the grain kernels, for discharging the chaff to said first outlet and for discharging the grain kernels to the second outlet.

2. The grain sampling device defined by claim 1, wherein the first surface of said threshing means is stationary, and the second surface is movable relative to the first surface.

3. The grain sampling device defined by claim 2, wherein the second surface comprises disk means mounted for rotation about a predetermined axis that is substantially perpendicular to said substantially planar threshing surfaces, and said drive means is constructed and arranged to effect rotation of said disk means.

4. The grain sampling device defined by claim 1, wherein the material to said threshing surface is resilient.

5. The grain sampling device defined by claim 4, wherein said material is rubber.

6. The grain sampling device defined by claim 1, which further comprises means for varying the space between said first and second threshing surfaces.

7. The grain sampling device defined by claim 1, which further comprises declustering means disposed between said inlet and said threshing means for the declustering clusters of the grain sample received through said inlet.

8. The grain sampling device defined by claim 7, wherein the declustering means comprises first and second pluralities of pins disposed transversely to the path of sampled grain movement from said inlet, and means for effecting relative movement between said first and second pluralities of pins, said first and second pluralities of pins being relatively disposed to define predetermined space therebetween as one set of pins moves relative to the other.

9. The grain sampling device defined by claim 7, wherein said first and second threshing surfaces are substantially vertically disposed, and which further comprises funnel means for guiding said declustered grain sample into the space between said threshing surfaces.

10. The grain sampling device defined by claim 1, wherein the separation means comprises:

angular vane means disposed downstream of said threshing means in the path of the threshed grain sample, the vane means being constructed and arranged to permit grain kernels to pass therethrough; and blower means for causing a stream of air to pass through said angular vane means, preventing the chaff from falling therethrough and blowing the chaff to said first outlet for discharge therefrom.

11. The grain sampling device defined by claim 10, wherein the angular vane means comprises a plurality of spaced vanes mounted within an open external frame, each of said vanes being transversely disposed to the path of grain movement and angled thereto to permit the passage of said stream of air angularly therethrough, said plurality of spaced vanes being disposed between the blower means and said first outlet, whereby said stream of air passes through the plurality of vanes and blows the chaff to and through said first outlet while permitting the grain kernels to fall through said plurality of vanes toward said second outlet.

12. The grain sampling device defined by claim 11, wherein the blower means is disposed laterally below the plurality of vanes and the first outlet is disposed laterally above the plurality of vanes.

13. The grain sampling device defined by claim 10, wherein the separation means further comprises reciprocation means for reciprocating the angular vane means transversely of the path of said threshed grain to facilitate the separation of chaff from said grain kernels.

14. The grain sampling device defined by claim 13, wherein the reciprocation means comprises rotatable cam means, cam follower means, biasing means for urging the cam follower means into engagement with the rotatable cam means, and linkage means operably connecting the cam follower means and the angular vane means.

15. The grain sampling device defined by claim 14, wherein the angular vane means comprises a plurality of angularly disposed vanes carried in an open external frame, and the linkage means comprises an elongated linkage member having one end secured to the cam follower means and the opposite end secured to said external frame.

16. The grain sampling device defined by claim 1, wherein the second outlet comprises a container for collecting the threshed and separated grain kernels.

17. The grain sampling device defined by claim 16, wherein said container comprises a drawer slidably carried by said housing.

18. The grain sampling device defined by claim 16, which further comprises moisture sensing means disposed in said container for sensing the moisture content of said grain kernels.

19. The grain sampling device defined by claim 1, which further comprises drive means for commonly driving said declustering means, said threshing means and said separating means.

20. The grain sampling device defined by claim 19, wherein the drive means comprises a detachable, manually operated handle.

21. The grain sampling device defined by claim 20, wherein the drive means comprises detachable motor means.

22. The grain sampling device defined by claim 21, wherein said motor means is electrically powered, and further comprises means adapting it for connection to an external source of electrical power.

23. The grain sampling device defined by claim 3, wherein the disk means comprises a gear wheel mounted for rotation within said housing, the gear wheel having a first face defining said second threshing surface, and which further comprises drive means for driving the gear wheel.

24. The grain sampling device defined by claim 23, wherein the drive means comprises a manually operable crank handle.

25. The grain sampling device defined by claim 23, wherein the drive means comprises motor drive means.

26. The grain sampling device defined by claim 23, which further comprises a second gear wheel mounted for rotation within the housing and disposed in intermeshing engagement with the first gear wheel for rotation thereby, a plurality of transverse pins carried by said second gear wheel and disposed transversely to the path of sampled grain movement, and a second plurality of transverse pins mounted in a stationary position within the housing, said first and second pluralities of pins being relatively disposed to define predetermined space therebetween as one set of pins moves relative to the other.

27. The grain sampling device defined by claim 26, wherein the separation means comprises angular vane means disposed downstream of said threshing means in the path of the threshed grain sample, the vane means being constructed and arranged to permit grain kernels to pass therethrough;

reciprocation means for reciprocating the angular vane means transversely of the path of said threshed grain to facilitate the separation of chaff from said grain kernels;

and blower means for causing a stream of air to pass through said angular vane means, preventing the chaff from falling therethrough and blowing the chaff to said first outlet for discharge therefrom.

28. The grain sampling device defined by claim 27, which further comprises means for operably connecting the first gear wheel, the reciprocating means and the blower means, whereby said declustering means, said threshing means and said separation means are commonly driven.

29. Grain threshing apparatus comprising:

housing means defining an inlet for harvested grain, a first outlet for chaff threshed from said harvested grain and a second outlet for grain kernels threshed from said harvested grain;

threshing means disposed in the housing means for threshing the sampled grain;

passage means defining a pathway for said harvested grain between the housing inlet and said threshing means;

separation means for separating chaff from the grain kernels, discharging the chaff to said first outlet and discharging the grain kernels to the second outlet;

and passage means defining a pathway for threshed grain between the threshing means and the separation means;

said threshing means comprising first and second substantially planar threshing surfaces disposed in substantially parallel relation, each of said threshing surfaces being formed at least in part from a material that is frictional relative to the harvested grain, and drive means for effecting relative movement between said first and second threshing surfaces while maintaining said spaced, substantially parallel relation.

30. The grain threshing apparatus defined by claim 29, wherein the first surface of said threshing means is stationary, and the second surface is movable relative to the first surface.

31. The grain threshing apparatus defined by claim 30, wherein the second surface comprises disk means mounted for rotation about a predetermined axis that is substantially parallel to said substantially planar threshing surfaces, and said drive means is constructed and arranged to effect rotation of said disk means.

32. The grain threshing apparatus defined by claim 29, which further comprises means for varying the space between said first and second threshing surfaces.

33. The grain threshing apparatus defined by claim 29, wherein the material of said threshing surfaces is resilient.

* * * * *